July 14, 1931.  F. H. LEWIS  1,814,716
ANTISKID CHAIN
Filed June 11, 1930

INVENTOR
Fred H. Lewis
By Archworth Martin,
Attorney.

Patented July 14, 1931

1,814,716

UNITED STATES PATENT OFFICE

FRED H. LEWIS, OF YORK, PENNSYLVANIA, ASSIGNOR TO UNITED STATES CHAIN & FORGING COMPANY, OF PITTSBURGH, PENNSYLVANIA, A CORPORATION OF DELAWARE

ANTISKID CHAIN

Application filed June 11, 1930. Serial No. 460,395.

My invention relates to anti-skid chains such as are employed on vehicle wheels and more particularly to chains of the reinforced or calk type.

One object of my invention is to provide an anti-skid chain that is of longer life than various standard types and which offers more effective resistance to skidding.

Another object of my invention is to provide an anti-skid chain that possesses greatly increased wearing qualities with relatively small increase in the amount of material employed in the chain structure.

Still another object of my invention is to provide an anti-skid chain of generally improved character.

Figure 1:
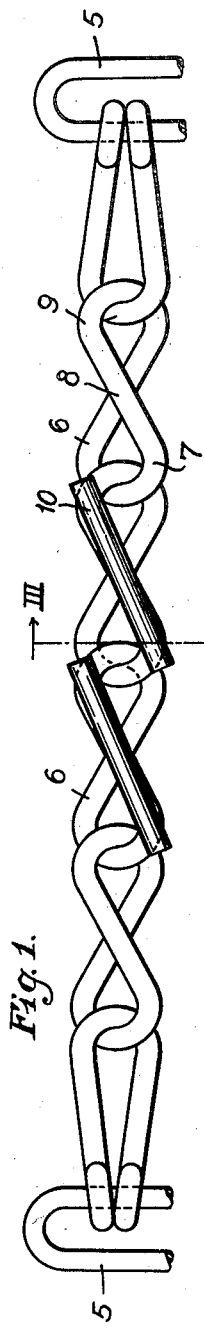
Figure 2:
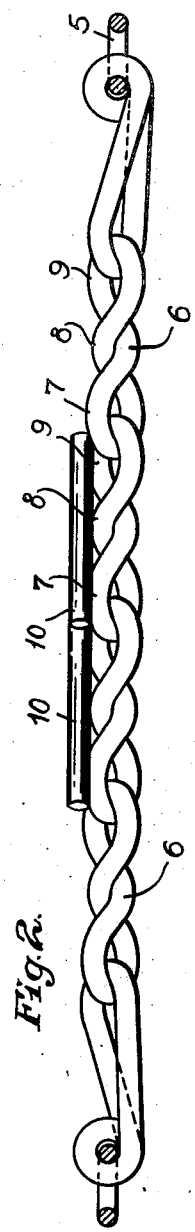
Figure 3:
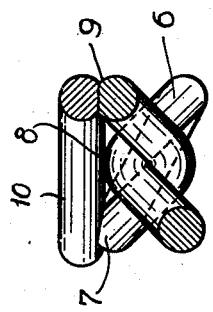

One form which my invention may take is shown in the accompanying drawings wherein Figure 1 is a fragmentary plan view of an anti-skid structure; Fig. 2 is an elevational view of the structure of Fig. 1; and Fig. 3 is a view, on an enlarged scale, taken on the line III—III of Fig. 1.

The numerals 5 designate links of side chains or tension members which may be of somewhat the usual form and to which the cross chains which extend across the tread of the tire are connected. The cross chains contain links 6 which are twisted through approximately 180° so that they may all lie in substantially a common plane, instead of successive links being disposed in planes at right angles to one another as is the case with ordinary straight or flat links which are connected together.

The twisting of the links produces bends and protuberant portions 7, 8 and 9, to which calks 10 may be welded. Usually, only the intermediate links of a cross chain are subjected to any considerable wear in road service, and therefore it is not necessary that calks be applied to all of the twisted links. After the links have been joined together and twisted, the calks may be fastened thereto in any suitable manner, preferably by applying welding current thereto by means of electrodes. Thereafter, the chain may be heat-treated to harden it.

The calks are of course on the outer or road-engaging side of the cross chains.

In the case of twisted links of either the standard type or the type shown in the drawings, the bends or protuberant portions receive substantially all of the wear and the chain becomes worn through at those points. The calks being welded to the protuberant portions or outwardly projecting bends, therefore, not only serve to effectively prevent skidding and slipping of the wheel to which the chain is applied, but protect the chain links from wear until the calks have been worn down. Thereafter, the chain will have a still further life, substantially equal to the life which it would have had if the calks had not been employed. The calks may be made of substantially the same gage of bar stock that enters into the structure of the links or of any other suitable gage or quality of material.

The diagonal arrangement of the calks 10 results in better resistance to skidding or slipping than if said calks were disposed in lines parallel to the cross chain or transversely thereof. Furthermore, they have the effect of protecting the links against breaking through road shocks, as sometimes happens in case the links have been too greatly hardened.

I claim as my invention:—

1. Anti-skid cross chains composed of links which are twisted through approximately 180°, and calks secured to and in parallelism with one of the diagonally-extending portions of each twisted link.

2. The combination with a chain link twisted through 180° to bring its side portions in diagonally crossed relation, of a calk secured to one of said said portions.

3. The combination with a chain link twisted through 180° to bring its side portions in diagonally crossed relation, of a calk secured to one of said side portions, the said calk being of elongated form and extending in a direction generally parallel to the last-named side portion.

4. The combination with a chain link twisted through 180° to bring its side portions in diagonally crossed relation, of a calk secured to one of said side portions, the said calk being of elongated form and extending in a direction generally parallel to the last-named side portion, for approximately the full length of the link.

5. The combination with a chain link twisted through approximately 180° to form three protuberant bends, of a calk secured against said bends and bridging the same.

6. The combination with a chain link twisted to form a protuberant bend adjacent to each end thereof, of a calk extending across and secured to said bends in overlying relation thereto.

7. The combination with a chain link twisted to form a protuberant bend adjacent to each end, at opposite sides of the longitudinal center line of the link, of a calk extending across the link and secured to the said bends in overlying relation thereto.

8. A chain structure comprising twisted links having protuberant bends and bar-like calks secured to said bends, in overlying relation thereto, and extending in directions diagonal to the longitudinal axis of the links, the said calks bridging the protuberances of their respective links.

In testimony whereof I, the said FRED H. LEWIS, have hereunto set my hand.

FRED H. LEWIS.